United States Patent
Hewitt et al.

(10) Patent No.: US 9,822,818 B1
(45) Date of Patent: Nov. 21, 2017

(54) BEARING ASSEMBLY WITH COMBINATION SET SCREW AND CONCENTRIC SHAFT LOCKING MECHANISM

(71) Applicant: Baldor Electric Company, Fort Smith, AR (US)

(72) Inventors: William G. Hewitt, Taylors, SC (US); Christopher E. Hosmer, Greer, SC (US)

(73) Assignee: BALDOR ELECTRIC COMPANY, Fort Smith, AR (US)

( * ) Notice: Subject to any disclaimer, the term of this patent is extended or adjusted under 35 U.S.C. 154(b) by 0 days.

(21) Appl. No.: 15/208,749

(22) Filed: Jul. 13, 2016

(51) Int. Cl.
| F16C 19/06 | (2006.01) |
| F16C 35/06 | (2006.01) |
| F16C 35/063 | (2006.01) |
| F16D 1/08 | (2006.01) |

(52) U.S. Cl.
CPC ............ *F16C 35/063* (2013.01); *F16C 19/06* (2013.01); *F16C 2226/10* (2013.01); *F16C 2226/50* (2013.01); *F16D 1/0847* (2013.01)

(58) Field of Classification Search
CPC ........ F16C 19/06; F16C 35/063; F16C 35/07; F16C 41/00; F16C 2226/10; F16C 2226/50; F16D 1/0847; F16D 1/0852
USPC ....... 384/537, 541, 559, 564, 585, 588, 903, 384/906; 411/32, 49, 360, 442, 427, 525, 411/529; 403/371, 373, 362
See application file for complete search history.

(56) References Cited

U.S. PATENT DOCUMENTS

| 239,875 A | 4/1881 | Melfi et al. |
| 2,437,305 A | 3/1948 | Nickle |
| 3,938,901 A * | 2/1976 | Howe, Jr. ............. F16C 35/063 384/539 |
| 3,957,319 A * | 5/1976 | Gorski .................. F16C 23/086 384/213 |
| 4,142,811 A * | 3/1979 | Burnham .............. F16D 1/0864 403/290 |
| 4,472,005 A | 9/1984 | Norton, II |
| 4,832,511 A | 5/1989 | Nisley et al. |
| (Continued) | | |

FOREIGN PATENT DOCUMENTS

GB 410465 A * 5/1934 ........... F02N 15/063

OTHER PUBLICATIONS

Dodge PT Components Engineering Catalog, 2015, Baldor Electric Company, 101 pages.

*Primary Examiner* — Marcus Charles
(74) *Attorney, Agent, or Firm* — Thompson Coburn LLP

(57) ABSTRACT

A bearing assembly has an inner ring with an inner diameter configured to receive a shaft. The inner ring has axial slots and at least two radial holes. A collar configured to surround the inner ring is provided. The collar has two radial holes. Each of the collar radial holes is alignable with the at least two inner ring radial holes. Each of the collar radial holes is configured to threadably receive set screws extendable from the collar through the at least two radial holes of the inner ring to engage the shaft. The collar has a radial slot and is adjustable to compress the radial slot to tighten the collar around the inner ring and the inner ring around the shaft. In the alternative, the bearing assembly may be provided with two collars—one for a set screw only configuration and another for a concentric clamping only configuration.

20 Claims, 4 Drawing Sheets

(56) References Cited

U.S. PATENT DOCUMENTS

| | | |
|---|---|---|
| 5,011,306 A | 4/1991 | Martinie |
| 5,052,842 A * | 10/1991 | Janatka .................. F16D 1/072 403/14 |
| 5,153,990 A | 10/1992 | Martinie |
| 5,400,885 A | 3/1995 | Phillips |
| 5,496,127 A * | 3/1996 | Muller .................. F16D 1/096 403/367 |
| 5,667,333 A | 9/1997 | Phillips |
| 5,735,615 A | 4/1998 | Pontzer |
| 5,765,961 A | 6/1998 | Phillips |
| 5,897,214 A | 4/1999 | Nisley |
| 5,908,248 A | 6/1999 | Nisley |
| 5,934,156 A | 8/1999 | Phillips |
| 5,951,198 A | 9/1999 | Phillips |
| 6,030,128 A | 2/2000 | Pontzer |
| 6,091,173 A | 7/2000 | Byrd |
| 6,098,263 A | 8/2000 | Subler et al. |
| 6,125,717 A | 10/2000 | Phillips |
| 6,147,619 A | 11/2000 | El-Ibiary |
| 6,202,507 B1 | 3/2001 | Phillips |
| 6,257,368 B1 | 7/2001 | Young |
| 6,272,941 B1 | 8/2001 | Phillips |
| 6,282,768 B1 | 9/2001 | Rapp |
| 6,290,234 B1 | 9/2001 | Eberle et al. |
| 6,325,379 B1 | 12/2001 | Rapp |
| 6,527,276 B1 | 3/2003 | Phillips et al. |
| 6,543,939 B1 | 4/2003 | Parejko |
| 6,599,052 B1 | 7/2003 | Phillips |
| 6,648,336 B1 | 11/2003 | Kostrzewsky et al. |
| 6,708,786 B2 | 3/2004 | Cariveau et al. |
| 6,745,640 B2 | 6/2004 | Nguyen |
| 6,912,927 B2 | 7/2005 | Eberle |
| 6,939,053 B2 | 9/2005 | Nisley et al. |
| 7,063,490 B2 * | 6/2006 | Ricker .................. F16B 4/002 411/14 |
| 7,217,193 B2 | 5/2007 | Nisley |
| 7,305,767 B2 | 12/2007 | Nisley et al. |
| 7,544,130 B2 | 6/2009 | Nisley |
| 7,788,786 B2 | 9/2010 | Hewitt et al. |
| 7,866,894 B2 | 1/2011 | Hewitt |
| 7,909,516 B2 | 3/2011 | Hewitt et al. |
| 8,151,465 B2 | 4/2012 | Hewitt |
| 8,746,984 B2 * | 6/2014 | Putt .................. F16D 1/096 29/592 |
| 8,872,465 B2 | 10/2014 | Umans et al. |
| 9,166,456 B2 | 10/2015 | Melfi |
| 9,556,901 B2 * | 1/2017 | Wheals .................. F16C 19/52 |
| 2009/0148093 A1 * | 6/2009 | Fahrni, Jr. .................. B60K 17/16 384/585 |

* cited by examiner

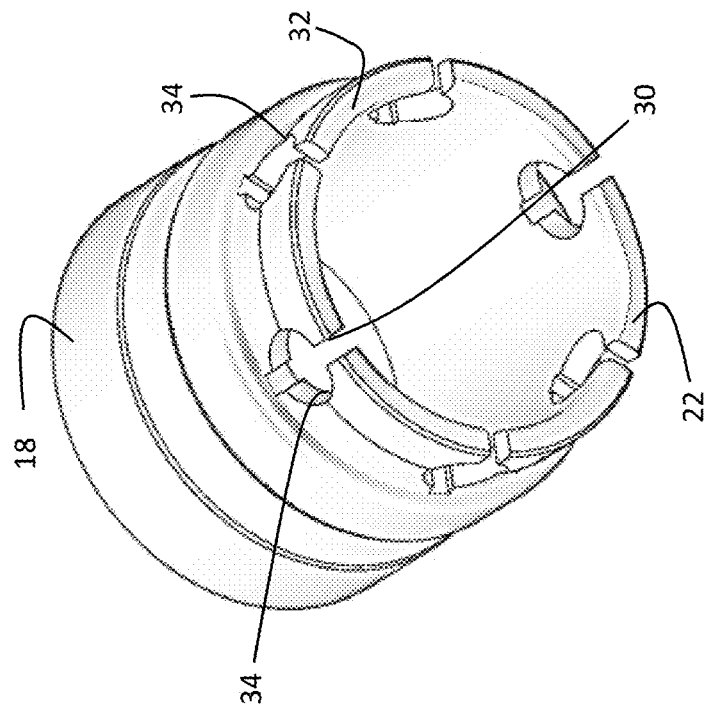
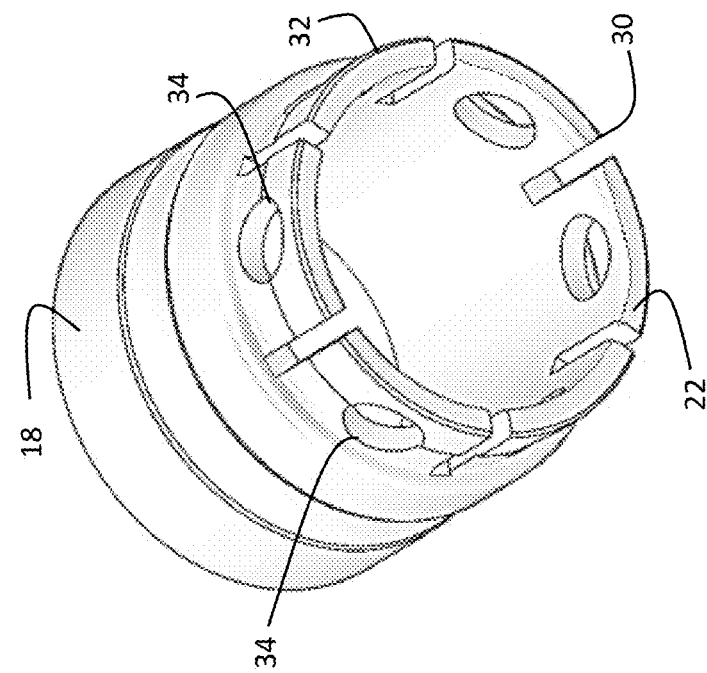

BEARING ASSEMBLY WITH COMBINATION SET SCREW AND CONCENTRIC SHAFT LOCKING MECHANISM

SUMMARY

This disclosure generally relates to a bearing assembly with a shaft locking mechanism. The bearing assembly may comprise a mounted bearing assembly. The shaft locking mechanism may include an inner ring which surrounds a shaft and a collar which surrounds the inner ring. The collar may be configured to receive set screws that may be threaded into the collar and passed through clearance holes in the inner ring to engage the shaft. In addition to, or in the alternative, the collar may have a radial slot allowing the collar to compress around the inner ring which in turn compresses the inner ring around the shaft.

BRIEF DESCRIPTION OF THE DRAWINGS

FIG. 4 is a perspective view of an alternate embodiment of an inner ring of a locking mechanism of a bearing assembly with more than two radial holes extending through tabs of the inner ring.

FIG. 5 is a perspective view of an alternate embodiment of an inner ring of a locking mechanism of a bearing assembly with more than two radial holes extending through slots formed in the inner ring.

DETAILED DESCRIPTION

Figure 1:
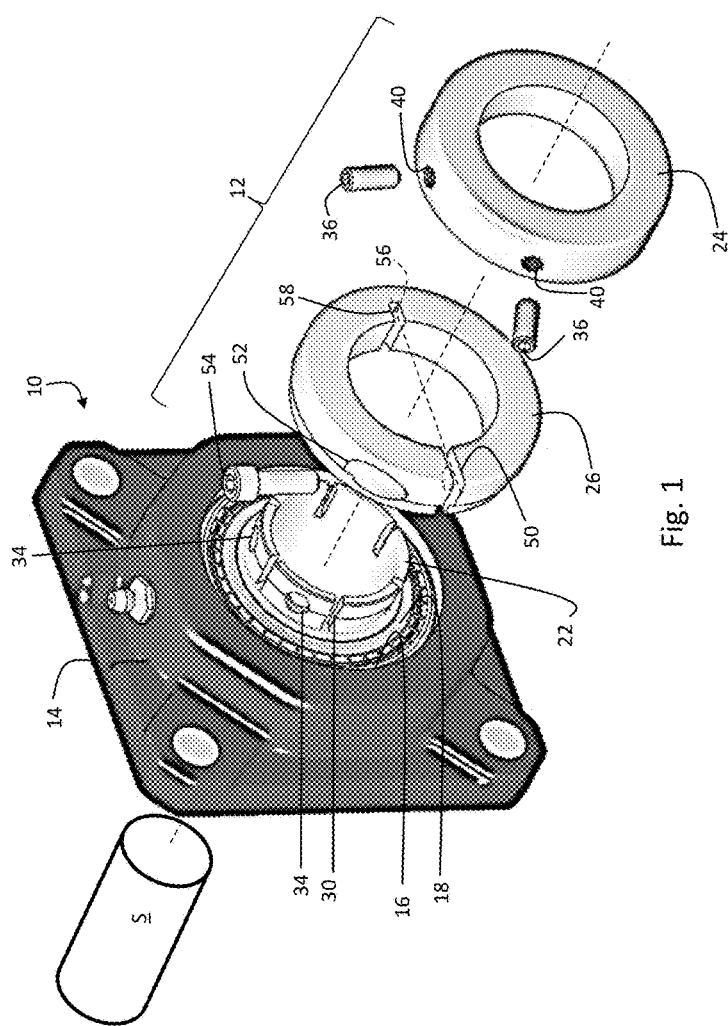
FIG. 1 is a perspective, exploded view of an embodiment of a bearing assembly with a locking mechanism including an inner ring, and a first collar configured for set screw engagement with a shaft and a second collar configured for generally concentric clamping engagement with the shaft.

FIG. 1 shows an embodiment of a bearing assembly 10 with a locking mechanism 12 for a shaft S. The bearing assembly may comprise a mounted bearing. The bearing 10 assembly may include a bearing housing 14 that receives an outer race 16 in a bore of the bearing housing. An inner race 18 may be disposed in the bearing housing 14 and spaced from the outer race 16, and rotational elements (see, e.g., FIG. 6, '20') may be disposed between the inner race and the outer race to provide relative rotary motion therebetween. The bearing assembly may also include other structural and functional elements such as a bearing cage and flinger (see, e.g, FIG. 6, '102','104') depending upon the application. The inner race 18 may have a ring-shaped portion 22, projecting axially from a side face of the inner race so as to extend outward and away from the bearing housing. The ring shaped, axially projecting portion 22 may be received in the bore of a collar (24,26), forming an inner ring that together with the collar comprises the shaft locking mechanism 12 for the bearing assembly. Prior to engaging the locking mechanism 12 with the shaft S, the inner race 18 and ring-shaped, axially extending portion 22 may have a neat slip fit with the shaft, and the collar 24,26 may have a neat slip fit with the inner ring. When the locking mechanism is engaged with the shaft, as will be described in greater detail below, the collar 24,26 cooperates with the inner ring 22 in mounting the bearing assembly to the shaft.

Figure 3:
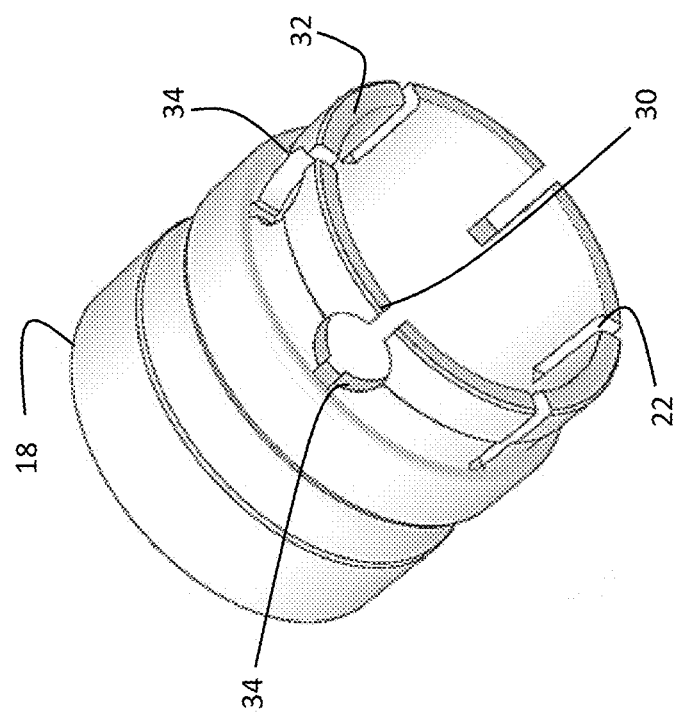
FIG. 3 is a perspective view of an alternate embodiment of an inner ring of a locking mechanism of a bearing assembly with two radial holes extending through axial slots formed in the inner ring.
Figure 2:
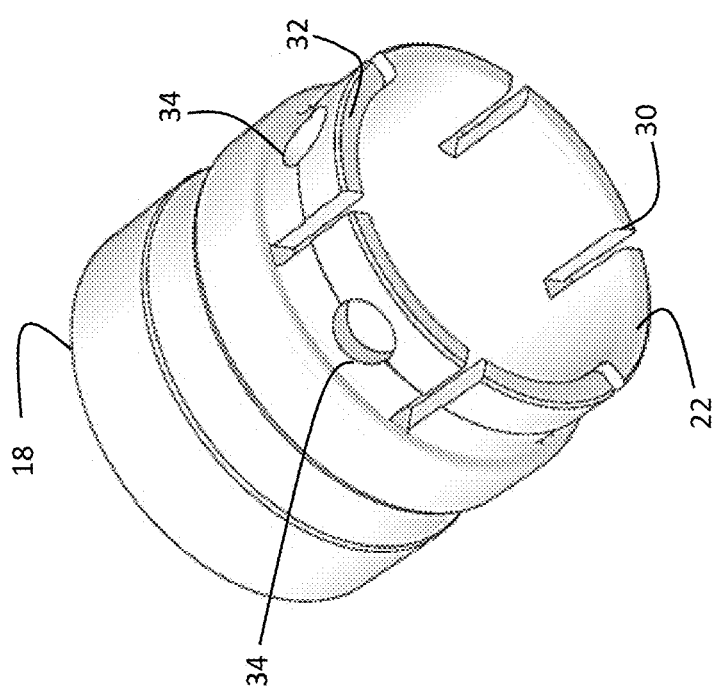
FIG. 2 is a perspective view of an embodiment of an inner ring of a locking mechanism of a bearing assembly with two radial holes extending through tabs of the inner ring.

Referring to FIGS. 2-5, the inner ring 22 of the locking mechanism 12 projects as a ring-shaped portion extending axially from a side face of the inner race 18. The inner ring 22 and inner race 18 may be monolithically formed. The inner ring 22 may have a plurality of axial slots 30 extending from a distal edge of the inner ring towards the inner race 18. The axial slots 30 may be formed in the inner ring 22 in a manner so as to provide arcuately shaped, axially projecting tabs 32 that extend from the axial side face of the inner race 18. As will be described, the axially projecting tabs 32 deflect against or otherwise allow the inner ring 22 to engage the shaft, to provide concentric-type contact of the inner ring with the shaft S when the locking mechanism is engaged. Various configurations of the inner race and the inner ring, including arrangements of the projecting tabs are shown in FIGS. 2-5. In FIGS. 2 and 3, the inner ring 22 (e.g., the plurality of arcuate tabs) is provided with two radial clearance holes 34. The radial clearance holes 34 allow set screws (see, e.g., FIG. 1, '36') from the collar 24 to pass therethrough to engage the shaft in engaging the locking mechanism 12 when mounting the bearing assembly to the shaft S. In FIG. 2, each radial clearance hole 34 is provided through an arcuate shaped tab 32. In FIG. 3, each radial clearance hole 34 is provided in line with the axial slot 30. In FIGS. 4 and 5, the inner ring 22 (e.g., the plurality of arcuate tabs) has more than two radial clearance holes 34. In FIG. 4, each of the radial clearance holes 34 is provided through the arcuate tab 32, and in FIG. 5, each of the radial clearance holes is provided in line with the axial slot 30. In FIGS. 2-5, the radial clearance holes 34 are shown equiangularly spaced about the inner ring 22. Other angular spacings may be used. Generally speaking, the radial clearance holes may be spaced apart by at least 60 degrees. A 60 degree spacing has been shown to provide good gripping force for the locking mechanism. FIGS. 2-5 also show consistency in the placement of the radial clearance holes 34 in that they are provided either through the arcuate tab 32 or in line with the axial slot 30. The radial clearance holes may be provided on the inner ring such that one radial clearance hole is in line with an axial slot and another radial clearance hole is through an arcuate tab. While FIGS. 2-5 show a plurality of axial slots 30 equiangularly spaced about the inner ring, different angular spacings of the axial slots may be provided resulting in arcuate tabs of different dimensions.

As shown in FIG. 1, the bearing assembly may have first and second collars 24,26, each of which may cooperate with the inner ring 22 in mounting the bearing assembly to the shaft. The first collar 24 may comprise a solid ring structure with radial holes 40 extending from the outer diameter to the inner diameter of the first collar. The holes 40 may be threaded to receive the set screws 36. The set screws 36 may be threaded through the threaded radial holes 40 of the first collar 24 and passed through the clearance holes 34 of the inner ring to engage the shaft S in engaging the locking mechanism 12 and attaching the bearing assembly to the shaft. In this configuration, as the set screws 40 are tightened in the first collar 24, the set screws provide point contact with the shaft S, and the area of the first collar 24 generally diametrically opposite of the set screws 40 is drawn against the inner ring 22, which in turn compresses the inner ring against the shaft. The second collar 26 has a radial slot 50 extending from the outer diameter to the inner diameter of the second collar 26. The radial slot 50 allows the second collar to be compressed around the inner ring 22. A gap of the radial slot 50 may be compressed to tighten the second collar 24 around the inner ring 22. The second collar 26 may have a tangential hole 52 which extends from the outer diameter of the second collar through the radial slot 50 with a threaded portion internal to the second collar. The tangential hole threaded portion may receive a mechanical fastener 54 directed through the tangential hole 52. The mechanical fastener 54 may be then be tightened to compress the gap of the radial slot 50. The second collar radial slot 50 may define a reference line 56 which includes a center axis of the second collar. The second collar 26 may also include a radial notch 58 opposite of the radial slot 50. The radial notch 58 may provide increased compressibility of the second collar 26, thereby promoting greater grip strength of the second collar.

Figure 6:
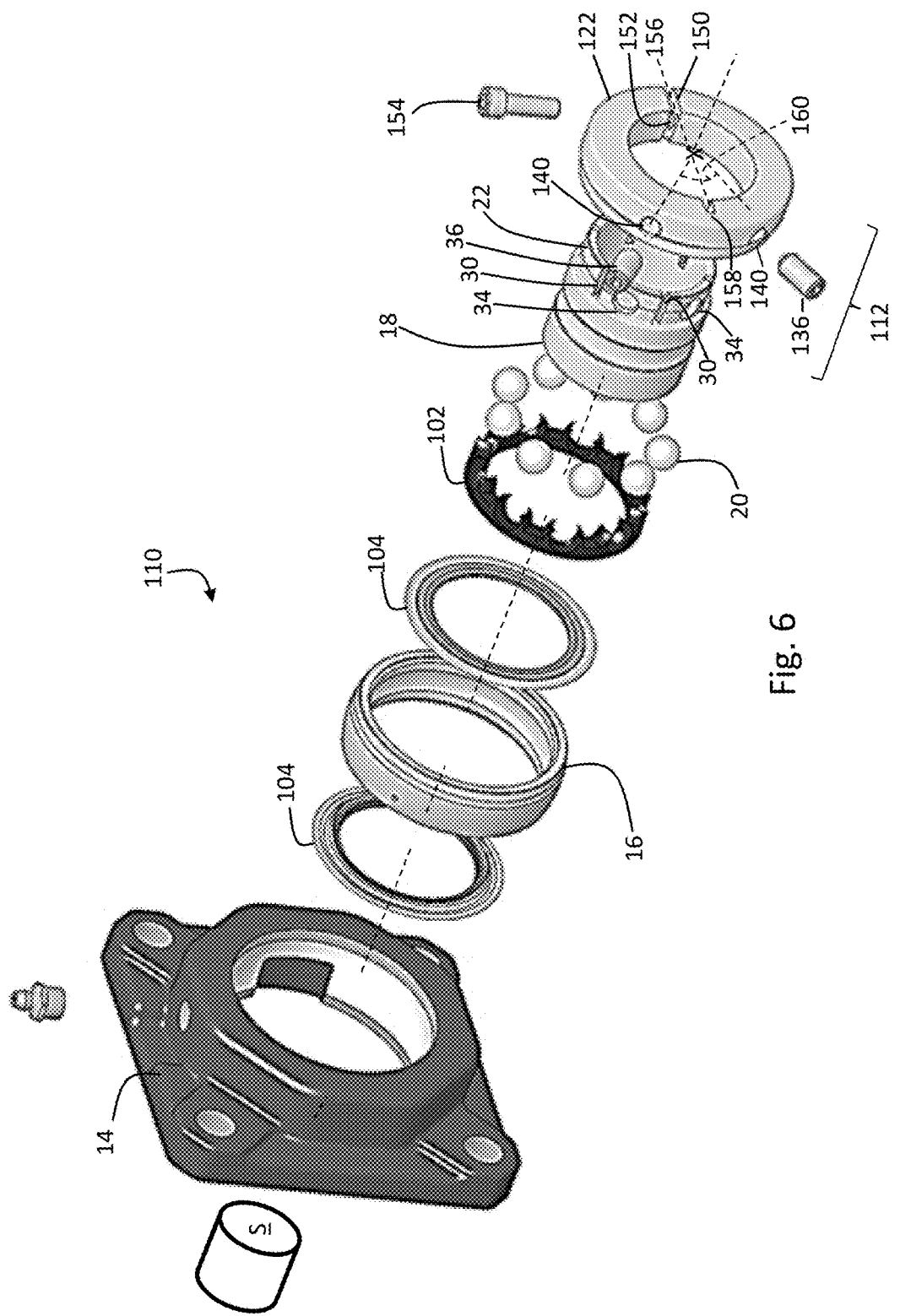
FIG. 6 is a perspective, exploded view of an alternate embodiment of a bearing assembly and locking mechanism including an inner ring and a locking collar configured for both set screw and clamping engagement with a shaft.

FIG. 6 shows another embodiment of the bearing assembly 110. The embodiment of FIG. 6 shares many of the same features as the embodiment of FIG. 1 and the common features are denoted with like reference characters. In the embodiment of FIG. 6, the locking mechanism 112 comprises a compressible collar 122 configured for use with set screws 136. In FIG. 6, the inner ring 22 and inner race 18 may be of the type shown in FIGS. 2-5. The collar 122 comprises radial holes 140 extending from the outer diameter to the inner diameter of the collar. The radial holes 140 may be threaded to receive the set screws 136. The collar 122 also has a radial slot 150 extending from the outer diameter to the inner diameter of the collar. The radial slot 150 enables the collar 122 to be compressed around the inner ring. A gap of the radial slot 150 may be compressed to tighten the collar 122 around the inner ring 22. The collar 122 may have a tangential hole 152 which extends from the outer diameter of the collar 122 through the radial slot 150 with a threaded portion internal to the collar. The tangential hole threaded portion may receive a mechanical fastener 154 directed through the tangential hole 152. The mechanical fastener 154 may be directed through the tangential hole 152 and tightened to compress the gap of the radial slot 150 of the collar 122, thereby tightening the collar around the inner ring 18 and in turn the inner ring around the shaft S. The radial slot 150 may define a reference line 156 which includes a center axis of the collar 122. The collar radial set screw holes 140 may be arranged on the collar 122 generally diametrically opposite of the radial slot 150. Placing the collar radial set screw holes 140 generally diametrically opposite of the radial slot 150 may offset distortion caused by the mechanical fastener 154 when tightened in the tangential hole 152. For instance, the collar radial set screw holes 140 may be centered apart from one another relative to the radial slot 150 and the reference line 156. As an example, when the radial slot 150 defines the reference line 156 through the center axis of the collar 122, the reference line may bisect the angle 160 formed between the radial set screw holes 140. Each set screw hole 140 may be provided at an equal angle above and below (relative to FIG. 6) the reference line 156. The radial set screw holes may be arranged on the collar where the angle 160 is at least about 60 degrees apart from one another. One radial set screw may be provided at 30 degrees in one direction relative to the reference line 156 and the other set screw hole may be provided 30 degrees in opposite direction relative to the reference line 156. The collar may have a radial notch 158 diametrically opposite the radial slot 150.

In engaging the locking mechanism 112 of the bearing assembly 110 shown in FIG. 6, the shaft S may be directed through the inner race 18 and inner ring 22 of the bearing assembly. The collar 122 may be placed over the inner ring 22 and rotated relative to the inner ring so as to align the collar radial set screw holes 140 with the inner ring clearance holes 34. The mechanical fastener 154 may be directed through the tangential hole 152 of the collar 122 so as to compress the gap of the radial slot 150, and tighten the collar around the inner ring 22, and the inner ring around the shaft S with the collar radial set screw holes 140 in register with the inner ring radial clearance holes 34. Once the collar 122 is sufficiently tightened around the inner ring 22 to mount the bearing assembly 110 onto the shaft S, the set screws 136 may be threaded through the collar radial set screw holes 140, passed through the clearance holes 34 of the inner ring, and engaged against the shaft to further secure the bearing assembly to the shaft.

In engaging the locking mechanism 12 of the bearing assembly shown in FIG. 1, the shaft S may be directed through the inner race 18 and the inner ring 22 of the bearing assembly 10. Depending upon the application, the first collar 24 or the second collar 26 may be selected. For instance, if the application will require generally high axial and radial loads and gripping capability, the first collar 24 may be selected. If the application will require generally high operating speeds with low tolerance for vibration and marring of the shaft S, the second collar 26 may be selected. In selecting the first collar 24, the first collar may be placed over the inner ring 22 and rotated so that the first collar radial set screw holes 40 align with the clearance holes 34 of the inner ring. Once aligned, the set screws 36 may be threaded through the first collar radial set screw holes 40, passed through the clearance holes 34 of the inner ring 22, and engaged against the shaft S to further secure the bearing assembly to the shaft. In selecting the second collar 26, the second collar may be placed over the inner ring 22. The mechanical fastener 54 may be directed through the tangential hole 52 of the second collar 26 so as to compress the gap of the radial slot 50 and tighten the second collar around the inner ring 22, and the inner ring around the shaft S to provide roughly 360° concentric clamping of the inner ring around the shaft.

The disclosure herein provides a combination set screw and concentric shaft mounting locking mechanism that meets various end use applications. For instance, the embodiment shown in FIG. 6 provides for one mounted bearing product that may be used in multiple applications, including both high-speed, low vibration applications and high axial and radial load applications. The embodiments of the bearing assemblies disclosed herein may reduce manufacturing costs as one inner ring of the type shown in FIGS. 2-5 may be used in the bearing assembly regardless of the type of collar. For instance, the first and second collars shown in the embodiment of FIG. 1 or the collar shown in the embodiment of FIG. 6 may be used with any of the inner rings shown in FIG. 2-5. Providing axial slots in the inner ring tends to result in less distortion of the inner ring during engagement of the locking mechanism as compared to an inner ring without slots, regardless of whether the collars of the embodiment of FIG. 1, or the collar of the embodiment of FIG. 6, are used. Providing more than two clearance holes in the inner ring tends to decrease distortion of the inner ring during engagement of the locking mechanism.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A bearing assembly comprising:
   a bearing with an inner race and outer race with rotational elements disposed therebetween, the inner race having an axially extending portion with an outer diameter and an inner diameter configured to receive a shaft passing therethrough, the axially extending portion having a plurality of axial slots and at least two radial holes, each radial hole configured to allow a set screw to pass therethrough;
   a first collar for the bearing assembly for assembling the bearing assembly in a first configuration, the first collar being receivable about the inner race axially extending portion outer diameter, the first collar having two radial holes, each of the first collar radial holes being threaded and alignable with the at least two radial holes of the axially extending portion, whereby when the bearing is mounted to the shaft and the first collar is assembled with bearing in the first configuration, the first collar radial holes are brought into register with the axially extending portion radial holes, and the set screw is threadable through each first collar threaded hole through the axially extending portion radial hole to engage the shaft; and
   a second collar for the bearing assembly for assembling the bearing assembly in a second configuration, the second collar being receivable about the inner race axially extending portion outer diameter, the second collar having a radial slot, the second collar radial slot being adjustable, whereby when the bearing is mounted to the shaft and the second collar is assembled with bearing in the second configuration, the second collar radial slot is compressed to tighten the second collar around the axially extending portion and the axially extending portion around the shaft.

2. The bearing assembly of claim 1, wherein the second collar has a tangential hole extending to the radial slot, the tangential hole having a threaded portion configured to receive a mechanical fastener to compress the second collar radial slot.

3. The bearing assembly of claim 1, wherein the axially extending portion has more than two radial holes.

4. The bearing assembly of claim 1, wherein at least one of the at least two radial holes of the axially extending portion includes the axial slot.

5. A bearing assembly comprising:
   an inner ring having an inner diameter configured to receive a shaft passing therethrough, the inner ring having a plurality of axial slots and at least two radial holes; and
   a collar configured to surround the inner ring, the collar having two radial holes, each of the collar radial holes being alignable with the at least two inner ring radial holes, each of the collar radial holes being configured to threadably receive set screws extendable from the collar through the at least two radial holes of the inner ring to engage the shaft, the collar having a radial slot, the collar being adjustable to compress the radial slot to tighten the collar around the inner ring and the inner ring around the shaft.

6. The bearing assembly of claim 5, wherein the collar has a hole extending in a direction perpendicular to the radial slot and extending to the radial slot, the tangential hole having a threaded portion configured to receive a mechanical fastener to compress the collar radial slot.

7. The bearing assembly of claim 5, wherein the inner ring has more than two radial holes.

8. The bearing assembly of claim 5, wherein a radial hole of the inner ring includes an inner ring axial slot.

9. The bearing assembly of claim 5, wherein the inner ring comprises an extension of an inner race of a bearing.

10. The bearing assembly of claim 5, wherein the inner ring has a plurality of axial slots extending from an axial side of the inner ring.

11. The bearing assembly of claim 5, wherein the radial holes are arranged on the collar at least 60 degrees apart from each other.

12. The bearing assembly of claim 5, wherein the collar radial slot defines a reference line including a center axis of the collar.

13. The bearing assembly of claim 12, wherein the collar radial holes are arranged on the collar apart from each other at an angle that is bisected by the reference line.

14. The bearing assembly of claim 5 wherein the collar radial holes are arranged on the collar generally diametrically opposite of the collar radial slot.

15. A bearing assembly comprising:
   an inner race having a plurality of arcuately shaped tabs projecting axially from an axial side of the inner race, the arcuately shaped, axially projecting tabs in part defining a ring shape configured to receive a shaft passing therethrough, and the plurality of arcuately shaped tabs having at least two radial holes extending therethrough; and
   a collar configured to surround the arcuately shaped tabs, the collar having at least two radial holes and a radial slot;
   wherein the at least two radial holes of the collar are alignable with the at least two radial holes of the plurality of arcuately shaped tabs;
   wherein the radial holes of the plurality of arcuately shaped tabs are larger than the collar radial holes such that when the collar surrounds the tabs and mechanical fasteners are directed through the collar radial holes, the mechanical fasteners of the collar pass through the radial holes of the plurality of tabs to engage the shaft; and
   wherein the collar is adjustable to compress the collar radial slot and deflect the tabs radially against the shaft.

16. The bearing assembly of claim 15, wherein one of the at least two radial holes of the plurality of the arcuately shaped projecting tabs is disposed between adjacent tabs.

17. The bearing assembly of claim 15, wherein the collar radial holes are arranged on the collar at least 60 degrees apart from each other.

18. The bearing assembly of claim 15, wherein the collar includes a notch diametrically opposite of the radial slot.

19. The bearing assembly of claim 18, wherein the collar radial holes are arranged on the collar on either side of the notch.

20. The bearing assembly of claim 15, wherein the collar radial holes are arranged on the collar generally diametrically opposite of the collar radial slot.

* * * * *